United States Patent Office 2,817,234
Patented Dec. 24, 1957

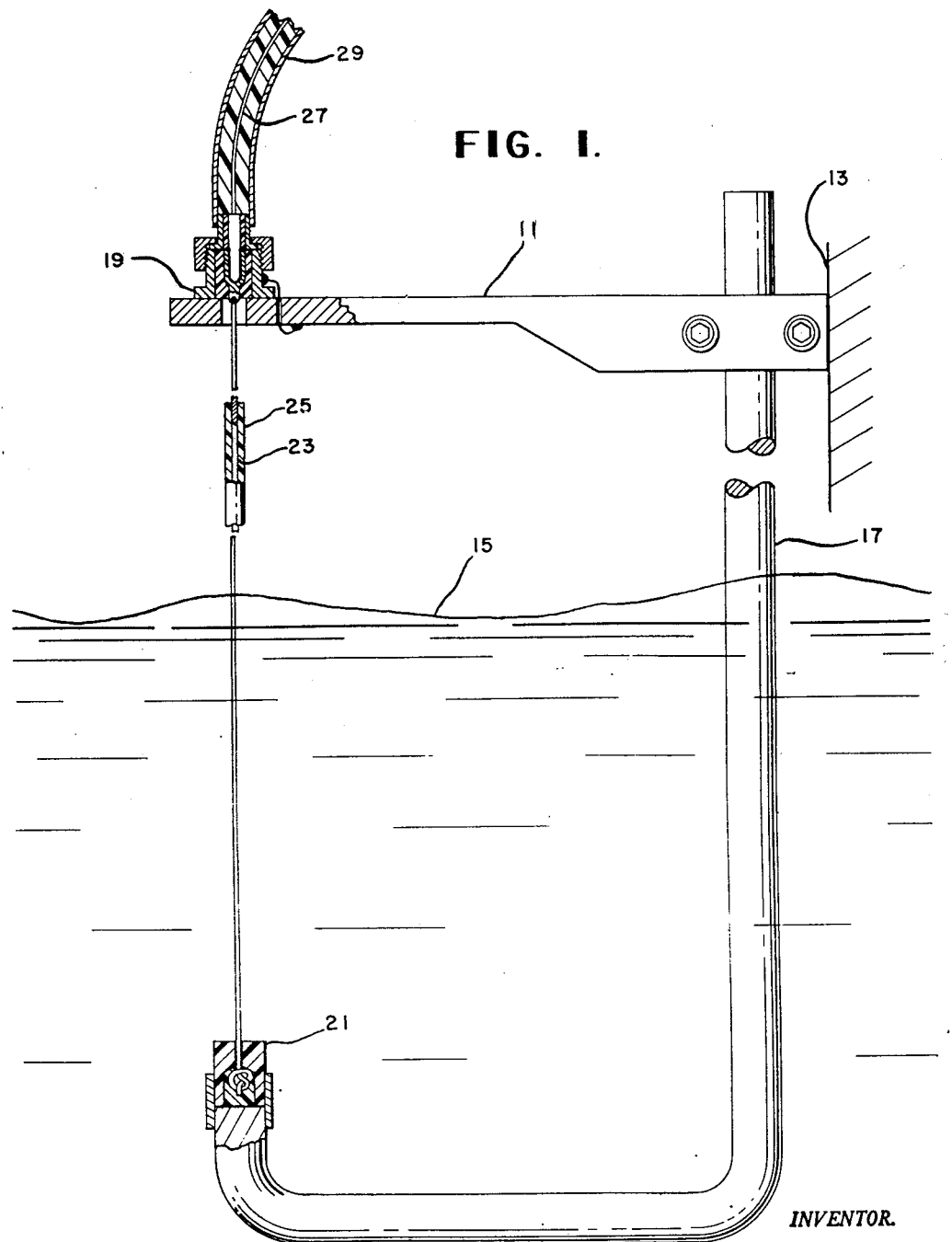

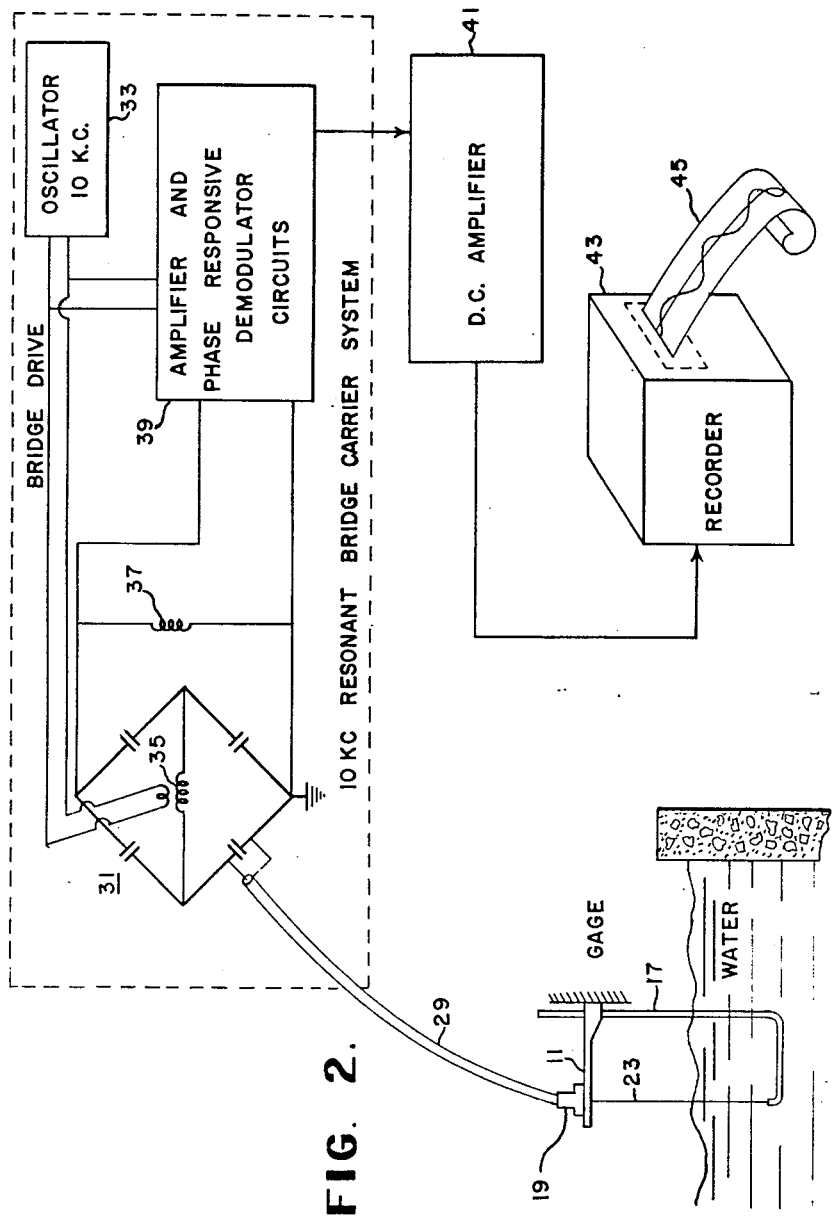

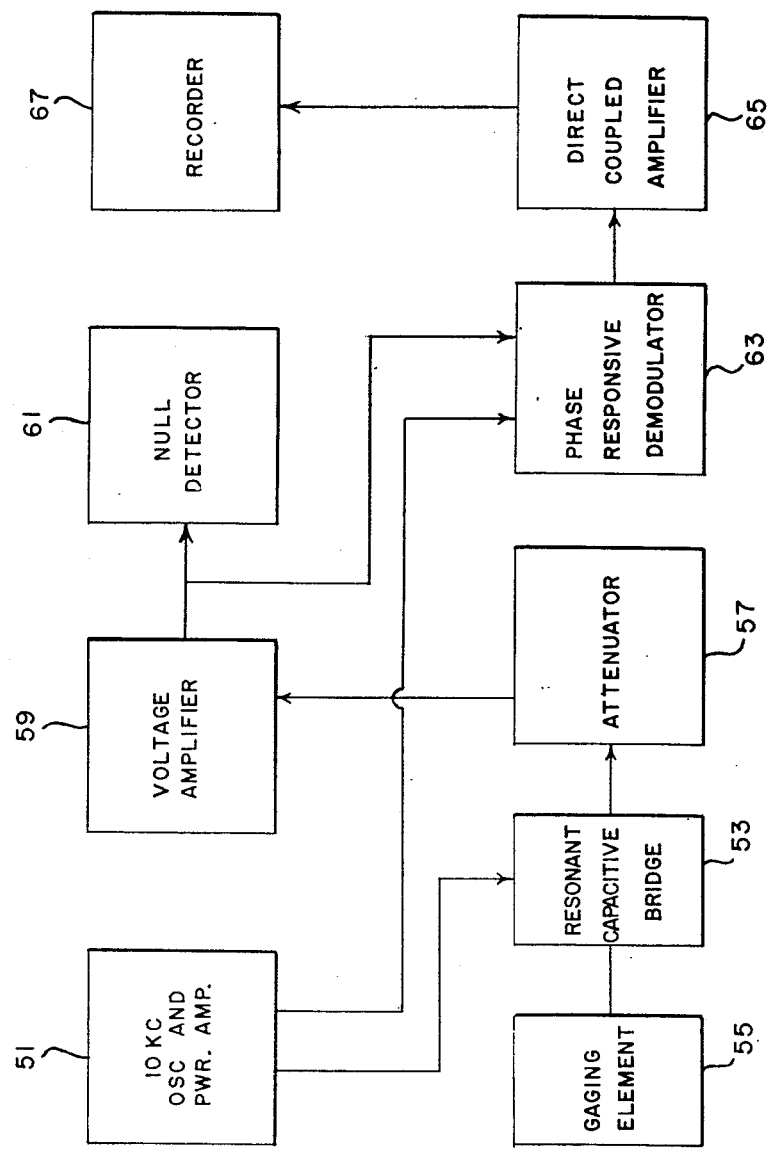

2,817,234
LIQUID LEVEL MEASURING APPARATUS

Willis S. Campbell, Damascus, Md., assignor to the United States of America as represented by the Secretary of the Navy Application August 7, 1953, Serial No. 373,075

5 Claims. (Cl. 73—304)

(Granted under Title 35, U. S. Code (1952), sec. 266)

The invention described herein may be manufactured and used by or for the Government of the United States of America for governmental purposes without the payment of any royalties thereon or therefor.

The present invention relates to an improved liquid level measuring or recording system which is capable of fast response, accurate and reliable results and linear response characteristics. More specifically the present system is an improved liquid level measuring system of the capacitance bridge type.

In general liquid level measurement systems employing a capacitance gaging element are known to the prior art. Such systems have been characterized by slow response and inaccuracies which preclude their use where the levels to be measured fluctuate rapidly. The problem becomes serious where a study involving measurement of wave heights or other transient conditions is to be undertaken.

It is an object of the present invention to provide a liquid level measurement system capable of rapid response to changing conditions.

It is a further object of the invention to devise a gaging element which produces a linear response to changing level conditions.

It is a still further object of the invention to provide a gaging element of improved accuracy which will not produce false indications of liquid level.

Still another object of the invention is to provide a system capable of producing a graphical representation of transient conditions of liquid level with respect to time.

A further object of the invention is to produce a simple reliable and inexpensive liquid level measurement system.

Other objects and many of the attendant advantages of this invention will be readily appreciated as the same becomes better understood by reference to the following detailed description when considered in connection with the accompanying drawings wherein:

Fig. 1 is a detailed view, partly in section, of an improved gaging element of the present invention.

Fig. 2 is a schematic drawing largely in block diagram form showing a simplified version of the invention.

Fig. 3 is a schematic drawing, largely in block diagram form, showing a preferred embodiment of the invention.

The system according to the present invention may be divided into three major functional parts. The first of these parts is a gaging element or pick-up unit. The second part consists of a resonant alternating current bridge, a phase responsive demodulator circuit and amplifier elements. The third part is a measuring unit responsive to the output of the bridge and demodulator circuit.

The gaging element broadly consists of a variable condenser whose capacity is varied in response to changes in the liquid level to be measured. The gaging element is connected in an arm of the resonant alternating current bridge to vary the balance thereof. The output voltage of the bridge circuit is applied to a linear phase responsive demodulator unit to produce a direct current varying in magnitude and polarity in accordance with the magnitude and phase of the bridge output voltage. The direct current output of the phase responsive demodulator is amplified and fed to the input of a recorder or other voltage indicating or measuring means. The recorder or other measuring means may be calibrated directly in terms of liquid level or wave height above or below an arbitrary reference level.

The variable capacitance gaging element used is shown in Fig. 1 of the drawings. A bracket member 11 is affixed to a support generally indicated at 13. The support may be of any suitable type and is positioned to hold the gaging element in the desired relationship to the surface 15 of the water or other liquid the level of which is to be measured. The support 13 may be provided with adjusting members (not shown) to set the apparatus in the desired position. Bracket 11 carries an electrically conductive J-shaped member 17 and an electrical connector element 19. The lower end of the J-shaped member 17 carries a block 21 of insulating material; and a length of wire 23 having an insulating coating 25 is stretched between the insulating block and the electrical connector element 19 mounted on the bracket. A portion of the wire with its insulating coating has been shown enlarged in order to show the details of this element. The wire 23 is mounted at its lower end by being knotted in the counterbored block 21 of insulating material. After knotting the end of the wire is insulated and waterproofed by filling the bore with an insulating varnish before mounting the insulating block on the J-shaped member 17. The longer leg and bottom of the J-shaped support form a contact section adapted to make an electrical contact with the liquid when immersed therein. The J-shaped member 17 is made adjustable with respect to the bracket 11 to place wire 23 under the proper degree of tension. A shielded lead with an inner conductor element 27 connected through connector element 19 to the wire 23 and its outer braid 29 similarly connected to the bracket member 11 and hence to the J-shaped member 17 as shown in section in the upper part of the figure.

It will be apparent that the gaging element as described constitutes a coaxial condenser having one plate formed by the wire 23 and the other plate formed by the conducting liquid, electrical connection to the liquid being made through the bracket 11 and the J-shaped member 17. The dielectric member of the condenser is formed by the insulating coating 25 on the wire 23. An increase in height of the water level with respect to the wire increases the effective area of the water electrode or plate of the condenser to increase the capacity of the gaging element condenser. A drop in water level is accompanied by a corresponding decrease in capacity.

The gaging element condenser is formed of relatively small diameter wire. A large diameter condenser element while desirable from a mechanical standpoint introduces errors due to the effect of the surface tension of the liquid. The wetted surface of the large member tends to exhibit slow flowback effects and precludes use of the gaging element for measurement of rapid changes of level. There is also an error introduced due to the miniscus effect, different effective values of capacitance being obtained when the water level is rising over that obtained when it is falling. It has been found that a gaging element condenser formed of No. 28 enameled copper wire has a mechanical strength to enable it to be placed under sufficient tension to prevent bending by advancing wave fronts and yet has a diameter small enough to decrease the flow back time and reduce the miniscus error to acceptacle proportions. A gaging element constructed as described has been found capable of following wave height variations up to at least four cycles per second and to have no appreciable miniscus error. A range of wire sizes has been used in the gaging element. The size will be determined by the conditions under which the element is to be used. Wire sizes from No. 36 through No. 12 have been found satisfactory for use as coaxial condenser elements.

The length of the wire used in the gaging element is not critical and will be determined by the size of the water level fluctuations to be encountered in the use of the system. Since one condenser electrode is formed by the fluid in which the wire is immersed the effective circuit has a resistive component. The gaging element appears to the bridge as a series circuit made up of the resistance of the fluid path and the capacitance of the condenser in series. Care should be taken to maintain a sufficient length of the gage wire submerged under the worst conditions to be expected so that the circuit does not become effectively a very large resistance in series with a very small condenser. With a twenty-four inch length gaging element satisfactory results have been obtained where the minimum length of the element submerged was of the order of four inches. The variation in capacitance under these conditions and the resultant unbalance of the bridge will bear a substantially linear relationship to the fluctuations from the reference level.

The conductivity of the fluid whose level is to be measured does not appear to affect the functioning of the system. The fluid forming one plate of the coaxial condenser element must be a conductor. It may, however, be a poor conductor without introducing erratic operation provided that a minimum length of wire is maintained submerged as explained above.

A simplified version of the complete system according to the invention is shown in schematic form in Fig. 2. The gaging element, previously described, is connected in one arm of a resonant bridge circuit indicated at 31. The bridge is energized from a source such as an oscillator 33 through a coupling indicated at 35. The output of the bridge 31 is fed through connections including a coupling device indicated at 37 to an amplifier and phase responsive demodulator element 39. The phase responsive demodulator circuit has a reference voltage applied thereto from the same source 33 that supplies the bridge circuit. The output of the amplifier and phase responsive demodulator, a direct current voltage which varies in magnitude and reverses in polarity in accordance with the magnitude and relative phase respectively of the bridge output voltage, is fed through a D. C. amplifier element 41 to a measuring instrument shown in the form of a recorder 43. The recorder 43, which may be of the galvanometer type well known in the art, traces a record of the fluctuations in water level on the record strip 45.

A suitable resonant bridge circuit and discriminator circuit for use in this invention is shown in the United States Patent No. 2,611,021 issued to Thomas A. Perls and George W. Cook on September 16, 1952. The details of the bridge circuit and discriminator form no part of the present invention and have been omitted to simplify the drawing. The patent has been cited only as a typical example of suitable circuits. Other equivalent circuits known to the art may be used.

A block diagram of an actual installation of a system according to the invention is shown in Fig. 3. The system is similiar to that of the simplified diagram of Fig. 2, but incorporates refinements designed to render the system better suited to operation in actual practice.

A source of energy consisting of an oscillator and power amplifier at 51 energizes a resonant bridge circuit at 53. A gaging element 55 connected in an arm of the bridge 53 is the same as the element shown in Fig. 1. The output signal from the bridge 53 is fed through an attenuator 57 to a voltage amplifier 59. Attenuator 57 is used to adjust the sensitivity of the system, i. e. where large variations in water level are expected to occur the proportion of the bridge output voltage used to operate the system may be reduced. The output of the voltage amplifier is passed to a null detector element or balance indicator 61. Element 61 may be used to balance the bridge 53 with the gaging element 55 set at a desired reference level in the fluid whose level is to be measured.

The output of voltage amplifier 59 is also fed to a phase responsive demodulator element 63. A reference voltage from the source 51 is also applied to element 63. The phase responsive demodulator converts the bridge output signal from a variable magnitude, reversible phase alternating current signal to a variable magnitude, reversible polarity direct current signal. The output of the demodulator 63 is applied through a direct coupled amplifier element 65 to a recorder element 67.

It is believed that the nature of all the elements of Fig. 3 and their manner of connection will be readily apparent to those skilled in the art. Reference is again made to the above-mentioned patent to Perls and Cook as showing the specific details of the various elements used in the system of Fig. 3.

The operation of the system of Fig. 3 is believed evident from the elements involved. The system is set up by physically adjusting the support of the gaging element to place it at the desired reference level. The usual setting is with approximately one half of the length of the gaging element submerged. The bridge is then balanced at this setting using the null detector or indicator and adjusting the elements of the bridge as described in the above-mentioned patent. The attenuator element is used to adjust the sensitivity of the system to the expected fluctuations in fluid level. The system is then placed in operation. Any deviation from the reference level of the liquid will produce an unbalance of the bridge which will be recorded by the system. As previously mentioned, meters or other voltage measuring devices may be used in place of the recorder element if desired.

The invention as described above is a sensitive, accurate liquid level measuring apparatus of fast response characteristics. It is particularly adapted to the measurement of transient conditions such as required in wave motion studies. It is simple in construction, reliable in operation and constitutes a great improvement over prior art apparatus intended to accomplish the same purpose.

Obviously many modifications and variations of the present invention are possible in the light of the above teachings. It is therefore to be understood that within the scope of the appended claims the invention may be practiced otherwise than as specifically described.

What is claimed is:

1. An impedance element responsive to transient variations in the level of a transversely moving liquid body when connected in an electrical network, comprising an elongated threadlike conductive element, a dielectric coating on said element, means for supporting said element under tension in an upwardly partially submerged relationship to said liquid body, said means comprising a conductive support insulatingly supporting said element at one end, a J-shaped conductive member connected to said support by its longer upright leg and insulatedly connected to the other end of said element by its shorter upright leg, and means for connecting said element and said support means in said electrical network.

2. An impedance element responsive to transient variations in the level of a transversely moving liquid body when connected in an electrical network, comprising an elongated threadlike conductive element, a dielectric coating on said element, means for supporting said element under tension in an upwardly partially submerged relationship to said liquid body, said means comprising a first support insulatingly holding said element at one end, a second support comprising a conductive rod-like upright portion extending downwardly into the liquid in relatively widely spaced relation to the threadlike element and comprising a transverse portion insulatedly holding the other end of said element, and terminal means connected to said element and said upright portion, whereby they can be connected in said electrical network.

3. A wave height measuring device for a transversely moving liquid comprising an upright electrically conductive linear element of very small diameter as compared to its length having a terminal for connection to an external circuit, a dielectric coating on said element, relatively rigid means for holding said element partially submerged in said liquid, said means insulatingly supporting said element and maintaining said element in tension, said means comprising transverse portions adapted to hold said element at both ends for holding said element in tension and comprising an upright conducting portion between said transverse portions, said upright portion being entirely on one side of said element and widely spaced therefrom, whereby waves are permitted to pass said element unrestricted.

4. A gaging element for a liquid level measuring system comprising a cylindrical electrically conducting element having a diameter which is very small with respect to its length, a dielectric coating on the surface of said conducting element, relatively rigid rod-like metallic means in electrical contact with said liquid, means cooperating with said metallic means insulatingly holding said cylindrical element at both ends and maintaining said element in tension and adapted to hold it partially submerged in the liquid, said metallic means comprising a single upright metallic portion, said single portion being relatively widely spaced from and on one side only of said conductive element so as to permit unrestricted flow of liquid past said conductive element, a pair of terminals, means to connect one of said terminals to said cylindrical element, and means to connect the other of said pair of terminals to said upright portion of said metallic means.

5. A wave height measuring means responsive to transient variations in the level of a liquid body having transversely moving waves, comprising a conductive element adapted to be in contact with said liquid, an elongated threadlike element comprising a fine conductive wire and a dielectric coating on said wire, means for supporting said threadlike element under tension in an upwardly partially submerged relationship to said liquid body, said means comprising a first support for insulatingly holding said threadlike element at one end above the wavy surface of the liquid and a second support for insulatedly holding the other end of said threadlike element below the wavy surface of the liquid, said supports being vertically spaced to hold said threadlike element stretched therebetween, said supporting means holding said threadlike element relatively widely spaced transversely from any other part of said measuring means, so as to permit unrestricted flow of said liquid past said threadlike element, a first terminal means electrically connected to said wire, and a second terminal means electrically connected to said conductive element, whereby said threadlike element and said liquid form a capacitor that can be connected in an electrical network through said terminal means.

References Cited in the file of this patent

UNITED STATES PATENTS

| | | |
|---|---|---|
| 1,584,613 | Comstock | May 11, 1926 |
| 2,375,084 | Coroniti | May 1, 1945 |
| 2,530,619 | Kliever | Nov. 21, 1950 |
| 2,541,576 | Detuno | Feb. 13, 1951 |

FOREIGN PATENTS

| | | |
|---|---|---|
| 520,540 | Great Britain | Apr. 26, 1940 |